United States Patent [19]
Moffett et al.

[11] Patent Number: 6,059,330
[45] Date of Patent: May 9, 2000

[54] VEHICLE CRASH BAR ASSEMBLY

[75] Inventors: Robert Moffett; Carol Moffett; James McAdam, all of Clontibret; Paul Quinn, Castleblaney; Gerard McHugh, Carrickmacross; Gerard Harte, Castleblaney; Andrew Wylie, Ballybay; Martin McVicar, Killybrone; Thomas Cadden, Monaghan, all of Ireland

[73] Assignee: Moffett Research and Development Limited, Clontibret, Ireland

[21] Appl. No.: 08/866,062

[22] Filed: May 30, 1997

[30] Foreign Application Priority Data

May 31, 1996 [IE] Ireland .................................. S960389
May 31, 1996 [IE] Ireland .................................. S960392

[51] Int. Cl.$^7$ .................................................. B60R 19/40
[52] U.S. Cl. ........................ 293/118; 293/119; 296/26.09
[58] Field of Search ..................... 293/118, 119; 296/26.09; 224/489, 490, 491

[56] References Cited

U.S. PATENT DOCUMENTS

| | | | |
|---|---|---|---|
| 3,488,077 | 1/1970 | Miller | 293/119 |
| 3,588,160 | 6/1971 | Reiner | 293/119 |
| 3,608,943 | 9/1971 | Gostomski | 293/119 |
| 4,247,138 | 1/1981 | Child . | |
| 4,396,341 | 8/1983 | Brouwer et al. | 414/467 |
| 4,951,991 | 8/1990 | Haigler | 296/26.09 |
| 5,711,561 | 1/1998 | Boysen | 293/119 X |
| 5,749,695 | 5/1998 | Moffett et al. | 414/467 |

FOREIGN PATENT DOCUMENTS

0 299 357  11/1989  European Pat. Off. .

*Primary Examiner*—D. Glenn Dayoan
*Assistant Examiner*—Jason Morrow
*Attorney, Agent, or Firm*—Jacobson, Price, Holman & Stern, PLLC

[57] ABSTRACT

A crash bar assembly for a vehicle having an auxiliary equipment carrying mode with, for example, a forklift extending beyond its rearmost portion. The impact absorbing bar forming part of the assembly is movable outwardly to adjacent the rearmost end of the forklift on bars in sockets. A forklift may have a crash bar assembly mounted on itself.

3 Claims, 6 Drawing Sheets

VEHICLE CRASH BAR ASSEMBLY

BACKGROUND OF THE INVENTION

1. Field of the Invention

This invention relates to a crash bar assembly for a vehicle chassis adapted for an auxiliary equipment carrying mode with the auxiliary equipment projecting rearwardly therefrom. It also relates to a crash bar assembly for a vehicle chassis to accommodate the carrying of loads generally projecting rearwardly therefrom and further relates generally to a crash bar assembly for auxiliary equipment which may be carried on the rear of a vehicle chassis so that it projects rearwardly therefrom to overhang the rear of the vehicle chassis.

2. Background Information

One of the principal problems in relation to such auxiliary equipment, for example, forklift trucks which are regularly carried on the rear of a vehicle chassis is that crashes do occur when they are on the chassis and they can cause considerable damage by being shifted relative to the truck chassis. Such forklift trucks are often called "piggy-back forklifts". There is thus a need to overcome this problem.

There are various regulations in force in relation to such crash bars, often referred to as rear underrun bumpers or rear underrun protection devices, these bumpers must be fitted as near as possible to the rear of the vehicle and the lower edge must not be more than 550 mm from the ground. Further, the crash bar or bumper must extend to within at least 100 mm from the outermost width of the axles and must not, in any case, extend beyond the width of the rear axle when measured across the outermost face of the tires. When auxiliary equipment is carried in piggy-back fashion, such as, for example, a piggy-back forklift, the forklift or other auxiliary equipment extends beyond the crash bar or underrun bumper so no matter how efficient and correctly fitted such a bumper is, it is of relatively little use when the vehicle is in the auxiliary equipment carrying mode. This equally applies to any projecting load.

Certain work has been done in relation to these crash bars such as, for example, described in European Patent Specification No. 0 299 357 (Daimler-Benz AG) which discloses a crash bar which can be raised or lowered relative to the vehicle.

However, the prior art does not disclose crash bar assemblies that will overcome the problems inherent in the present constructions which are generally speaking either totally rigidly secured adjacent the rear of a vehicle chassis or are given some minor or limited movement such as for example described in U.S. Pat. No. 4,247,138. None show a crash bar that could be used to achieve the objects of the present invention.

OBJECTS

The present invention is directed towards overcoming the difficulties inherent in the mounting of such loads, whether they be auxiliary equipment or simply loads that overhang the rear of a vehicle. The present invention is directed towards providing an improved construction of crash bar for use generally with such vehicle chassis and auxiliary equipment.

SUMMARY OF THE INVENTION

According to the invention there is provided a crash bar assembly for a vehicle chassis to accommodate the carrying of loads projecting rearwardly therefrom comprising:

a solid impact absorbing bar;

mounting means for mounting the solid impact absorbing bar adjacent the rear of a vehicle chassis, the mounting means allowing movement of the solid impact absorbing bar from a position adjacent the rear of the vehicle chassis to an extended position beyond the vehicle chassis and spaced apart therefrom; and locking means for securing the solid impact absorbing bar in its extended position.

Once there is an impact absorbing bar located in this fashion, then the major problem in relation to carrying auxiliary equipment or projecting loads is overcome.

Further the invention provides a crash bar assembly in which the mounting means is telescopic. A telescopic arrangement is an exceedingly efficient way of moving the impact absorbing bar between two positions. One impact absorbing bar can be used and there is relatively little expensive.

In one preferred embodiment of the invention the mounting means comprises:

a pair of rearwardly extending support bars connected in spaced apart relationship to the solid impact absorbing bar;

a pair of sockets for reception of the support bars;

means for rigidly connecting the sockets to a vehicle chassis; and locking means for securing the support bars in a number of different relative locations within the sockets comprising a locking pin and associated alignment means formed by axial through holes in the support bars and sockets.

By allowing adjustment of the solid impact absorbing bar it is possible to fix the impact absorbing bar in a number of positions relative to the rear of the vehicle chassis and thus to accommodate differing load overhangs.

In another embodiment of the invention the mounting means comprises a pivot arm for interconnecting the impact absorbing bar and the vehicle chassis. Pivotal mounting is often advantageous, particularly where a high chassis is involved.

In one example of a pivotal mounting the mounting means comprises:

a pair of link arms;

a hinge connecting the link arms;

a pivotal chassis connector for securing the free end of one link arm to the vehicle chassis; and a pivotal impact bar connector for securing the free end of the other link arm to the impact absorbing bar;

and in which the locking means comprises:

a link arm embracing sleeve slidable over the hinge when the link arms are in line and the impact absorbing bar is in the extended auxiliary position.

The advantage of this arrangement is that by having two link arms greater travel can be achieved and a neater folding of the pivot arms beneath the chassis is obtained. The use of a sleeve to lock a link arm is one that is particularly suitable because if the dimensions are correctly chosen it is relatively easily slipped on and off the hinge.

Further the invention provides a crash bar assembly for a vehicle chassis adapted for an auxiliary equipment carrying mode with the auxiliary equipment projecting rearwardly therefrom comprising:

a solid vehicle impact bar;

mounting means for mounting the vehicle impact absorbing bar rigidly adjacent the rear of a vehicle chassis;

an auxiliary equipment mounting means secured to the vehicle chassis;

a solid equipment impact bar; and means for mounting the solid equipment impact bar on the auxiliary equipment.

By putting what is in effect a crash bar assembly on the ear of the auxiliary equipment, it means that auxiliary equipment can be safely mounted on vehicles that already have a crash bar assembly fitted thereto. Thus supplying a solid vehicle impact bar as part of the assembly the auxiliary equipment can be mounted on many vehicles with the same safety as with the previous embodiments. There is no need to match the impact bars.

One particular suitable form of such a crash bar assembly is provided in which the means for mounting the solid equipment impact bar comprises:

a mounting underneath the auxiliary equipment;

a pivot bar interconnecting the equipment impact bar and the mounting underneath the auxiliary equipment, the equipment impact bar being pivotal from a storage position beneath the auxiliary equipment to a depending operative position adjacent the rear of the auxiliary equipment when being carried by the auxiliary equipment mounting means; and locking means for securing the equipment impact bar, in the storage and operative positions.

Generally speaking mounting a solid equipment impact bar beneath the auxiliary equipment will ensure that it will not be damaged when the auxiliary equipment is being used and will not in any way impede the operation of the auxiliary equipment.

Another means for mounting the solid equipment impact bar comprises:

a mounting underneath the auxiliary equipment;

a pivot bar interconnecting the equipment impact bar and the mounting underneath the auxiliary equipment, the equipment impact bar being pivotal from a storage position beneath the auxiliary equipment to a depending operative position adjacent the rear of the auxiliary equipment when being carried by the auxiliary equipment mounting means;

locking means for securing the equipment impact bar, in the storage and operative positions; and a fluid operated ram for pivoting the equipment impact bar between its storage and operative positions.

The use of a fluid operated ram ensures that the operator does not have to expend energy on putting the equipment impact bar in position.

Further, in another embodiment there is provided control means for varying the fluid pressure in the ram to vary the impact absorbing properties of the crash bar assembly. This allows optimum impact absorbtion.

In a still further embodiment of the invention, the crash bar assembly comprises:

a solid vehicle impact bar;

mounting means for mounting the vehicle impact absorbing bar rigidly adjacent the rear of a vehicle chassis;

an auxiliary equipment mounting means secured to the vehicle chassis;

a solid equipment impact bar;

means for mounting the solid equipment impact bar on the auxiliary equipment;

a pivot bar interconnecting the equipment impact bar and the rear of the auxiliary equipment, the equipment impact bar being pivotal from a storage position against the rear of the auxiliary equipment to an operative position beneath and adjacent the rear of the auxiliary equipment when being carried by the auxiliary equipment mounting means.

Very often having the equipment impact bar against the rear of the vehicle will act as a further protection for the driver during operation and indeed could be so-located as to effectively provide the equivalent of a "roll-over" bar. Again means may be provided for pivoting the solid impact bar in this latter embodiment.

In a still further embodiment of the invention, there is provided means for mounting the solid impact bar which comprises:

guide means extending upwardly across the rear of the auxiliary equipment;

slider means engagable within the guide means movable within the guide means between a raised storage position and a lowered operative position; and means for mounting the solid impact bar on the slider means.

Again means for raising and lowering the slider means may be provided.

In these two latter embodiments, again the impact bar can be readily easily raised and lowered and provides, as mentioned already, additional protection for the operator, when auxiliary equipment such as a forklift truck is being used.

The invention further provides a crash bar assembly comprising:

a solid vehicle impact bar;

mounting means for mounting the vehicle impact absorbing bar rigidly adjacent the rear of a vehicle chassis;

an auxiliary equipment mounting means secured to the vehicle chassis;

adjustment means intermediate the ends of the vehicle impact bar for moving portion of it out of the way of the auxiliary equipment when mounting the auxiliary equipment;

a solid equipment impact bar; and means for mounting the solid equipment impact bar on the auxiliary equipment.

In this latter embodiment by having the adjustment means intermediate the ends of the vehicle impact bar, it will be possible to move the vehicle impact bar into and out of its operative position without fouling the auxiliary equipment, such as a piggy-back forklift.

The invention further provides a crash bar assembly for auxiliary equipment which may be carried on the rear of a vehicle chassis and projecting rearwardly therefrom to overhang the rear of the vehicle chassis comprising:

a solid equipment impact absorbing bar;

means for mounting the solid impact absorbing bar on the auxiliary equipment, said mounting means allowing movement of the solid impact absorbing bar from a storage position which allows the auxiliary equipment to be used as required to an operative position which allows the crash bar assembly to function when the auxiliary equipment is carried on the rear of a vehicle chassis.

The advantage of providing this assembly in this way means that even if the vehicle chassis has not got a crash bar assembly or by its very nature doesn't require one, when a piece of auxiliary equipment such as a forklift truck is mounted on the rear thereof, the forklift truck or other auxiliary equipment will have the necessary crash bar assembly.

A particularly suitable crash bar assembly of this latter type comprises:

a solid equipment impact absorbing bar;

means for mounting the solid impact absorbing bar on the auxiliary equipment, said mounting means allowing movement of the solid impact absorbing bar from a storage position which allows the auxiliary equipment to be used as required to an operative position which allows the crash bar assembly to function when the auxiliary equipment is carried on the rear of a vehicle chassis;

a pivot bar interconnecting the equipment impact bar and the mounting underneath the auxiliary equipment, the equipment impact bar being pivotal from a storage position beneath the auxiliary equipment to a depending operative position adjacent the rear of the auxiliary equipment when being carried by the auxiliary equipment mounting means; and locking means for securing the equipment impact bar, in the storage and operative positions.

Pivoting allows considerable flexibility in construction as has been mentioned already in relation to a previous embodiment.

A modification of the latter embodiment is a crash bar assembly in which there is provided a fluid operated ram for pivoting the equipment impact bar between its storage and operative positions and again control means may be provided for varying the fluid pressure in the ram to vary the impact absorbing properties of the crash bar assembly with substantially the same advantages as hereinbefore mentioned.

Further the invention provides another crash bar assembly comprising:

a solid equipment impact absorbing bar;

means for mounting the solid impact absorbing bar on the auxiliary equipment, said mounting means allowing movement of the solid impact absorbing bar from a storage position which allows the auxiliary equipment to be used as required to an operative position which allows the crash bar assembly to function when the auxiliary equipment is carried on the rear of a vehicle chassis;

a pivot bar interconnecting the equipment impact bar and the rear of the auxiliary equipment, the equipment impact bar being pivotal from a storage position against the rear of the auxiliary equipment to an operative position beneath and adjacent the rear of the auxiliary equipment when being carried by the auxiliary equipment mounting means.

In a still further embodiment of the invention there is provided a crash bar assembly comprising:

a solid equipment impact absorbing bar;

means for mounting the solid impact absorbing bar on the auxiliary equipment, said mounting means allowing movement of the solid impact absorbing bar from a storage position which allows the auxiliary equipment to be used as required to an operative position which allows the crash bar assembly to function when the auxiliary equipment is carried on the rear of a vehicle chassis;

guide means extending upwardly across the rear of the auxiliary equipment;

slider means engagable within the guide means movable within the guide means between a raised storage position and a lowered operative position; and means for mounting the solid impact bar on the slider means.

BRIEF DESCRIPTION OF THE DRAWINGS

Other features and advantages of the invention will be apparent from the following description taken in connection with the accompanying drawings, wherein.

DESCRIPTION OF THE PREFERRED EMBODIMENTS

Referring to the drawings and initially to FIGS. 1 to 5 thereof, there is illustrated a crash bar assembly indicated generally by the reference numeral 1 mounted on a chassis 2. The chassis 2 is adapted for mounting auxiliary equipment, in this case a piggy-back forklift truck on the back of it. The mounting kit is not illustrated in these drawings. The crash bar assembly 1 comprises a solid impact absorbing bar 3 which has a central permanently rigid portion 4 and a pair of foldable extension arms 5, which can be retained in the extended position by locking pins not shown. One of these extension arms 5 is shown folded in the drawings and one of the extension arms 5 is shown extended. The rigid portion 4 is mounted on bars 6 slidable within sockets 7. The bar 6 and socket 7 are square sectioned tubing. The socket 7 is suspended by supports 8 from the chassis 2.

Figure 1:
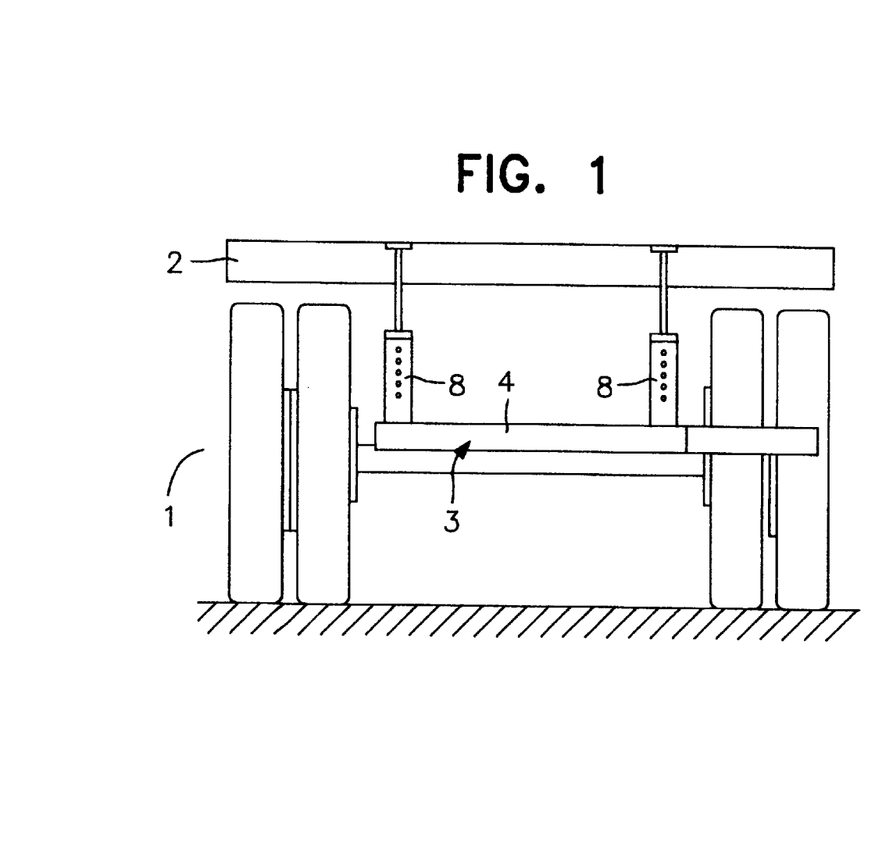
FIG. 1 is an end diagrammatic view of a crash bar according to the invention.
Figure 2:
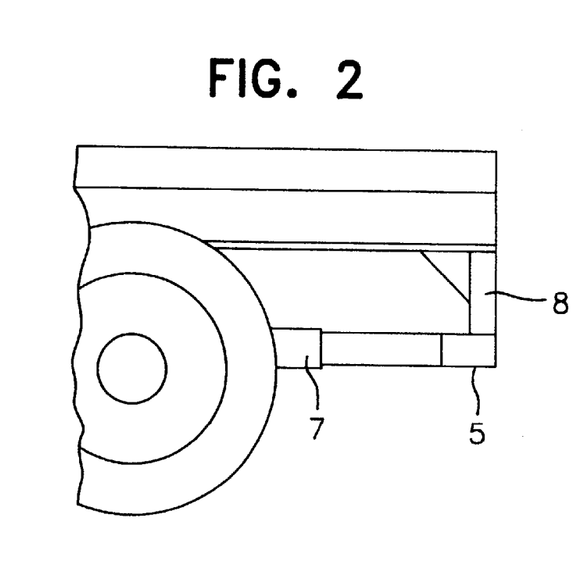
FIG. 2 is a side view of the crash bar of FIG. 1.
Figure 3:
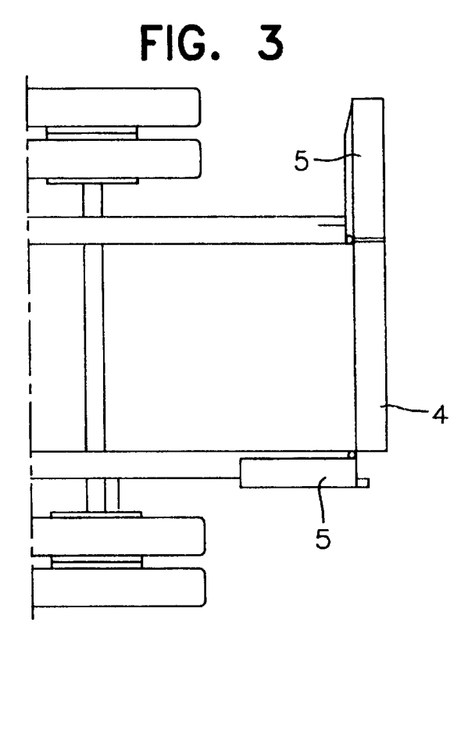
FIG. 3 is a plan view of the crash bar.
Figure 4:
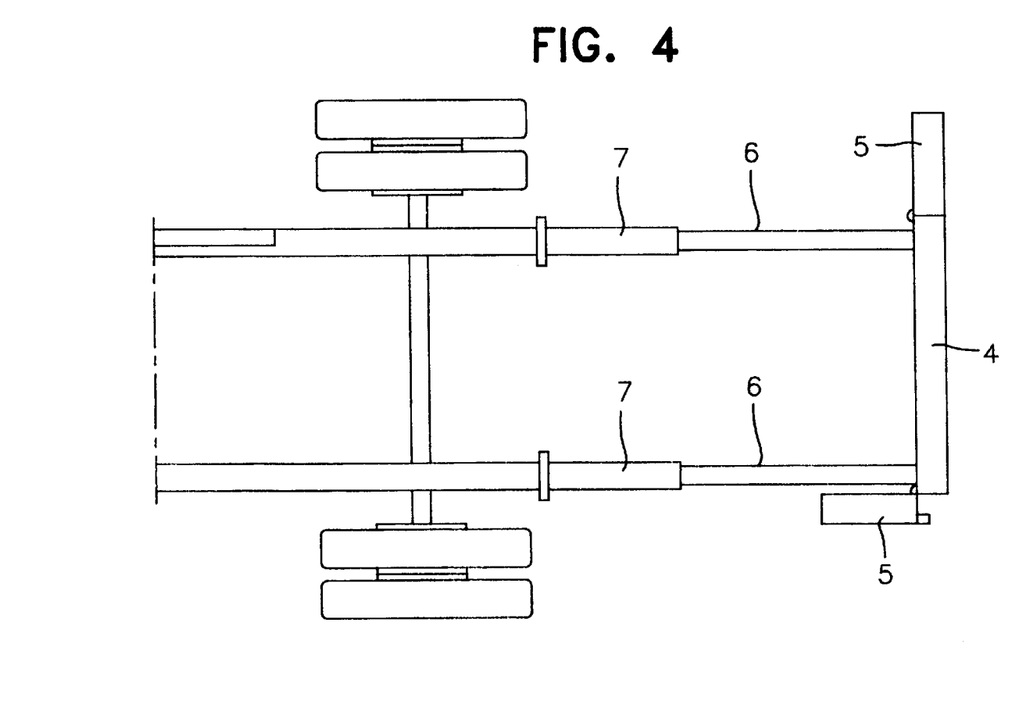
FIG. 4 is another plan view showing the crash bar in an extended position.
Figures 5, 8:
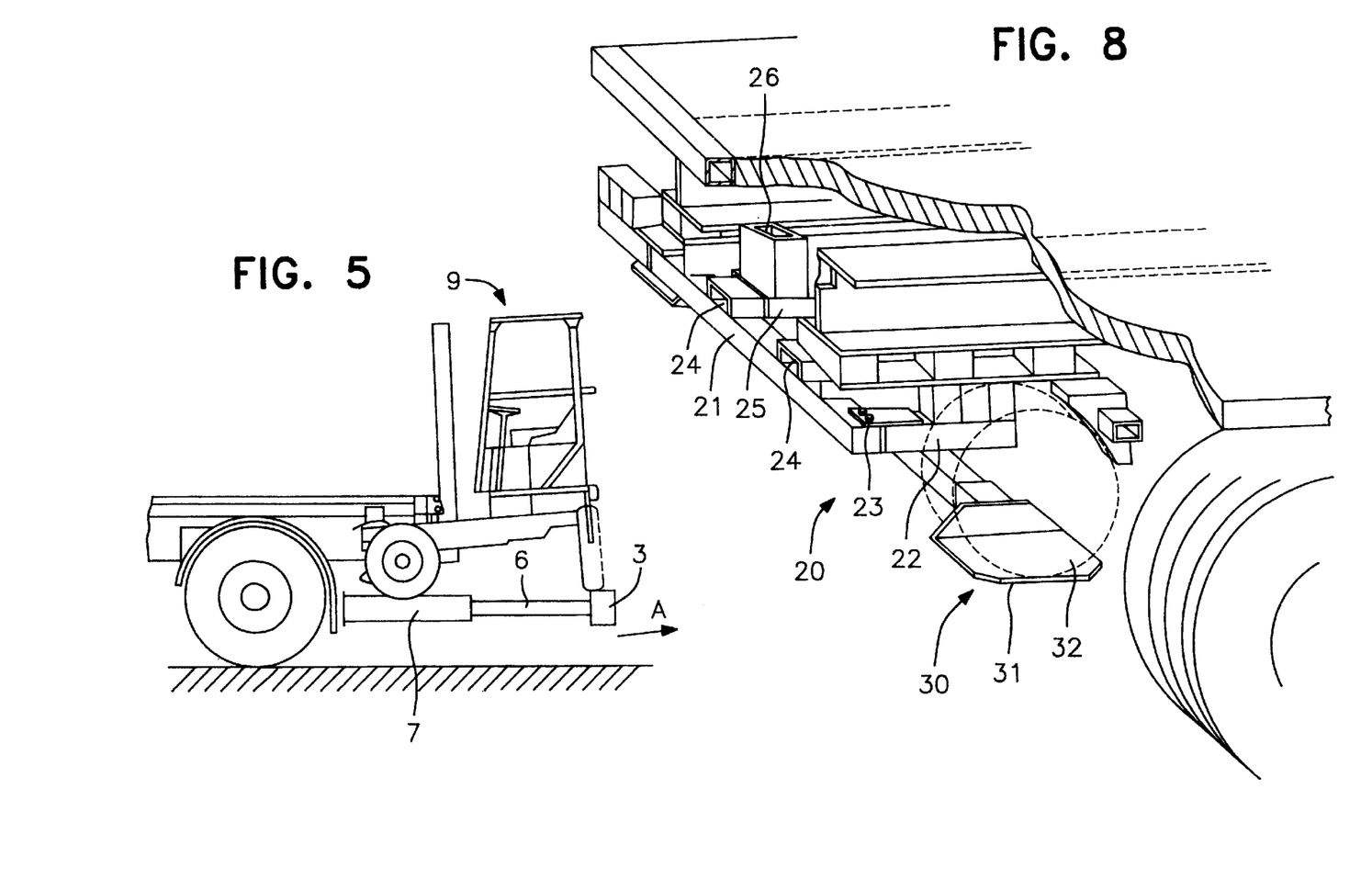
FIG. 5 is a side view of the crash bar and showing a forklift truck on the vehicle chassis.
FIG. 8 is a detailed partially cut away view of portion of a crash bar and mounting kit mounted on a vehicle chassis.

In use, as can be seen from FIG. 5, when a piggy-back forklift identified by the reference numeral 9 is mounted on the truck in conventional manner, the impact absorbing bar 3 may be moved outwards in the direction of the arrow A to form a rigid crash bar which is retained in position by locking pins, not shown, engaging the bar 6 within the socket 7.

Figure 6:
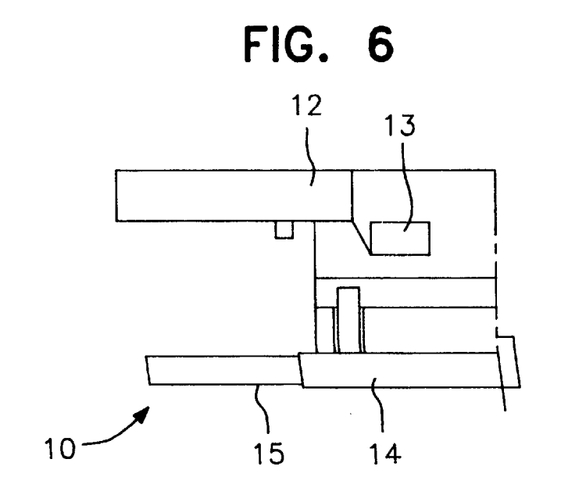
FIG. 6 is a end view of an alternative construction of crash bar on a trailer chassis.
Figure 7:
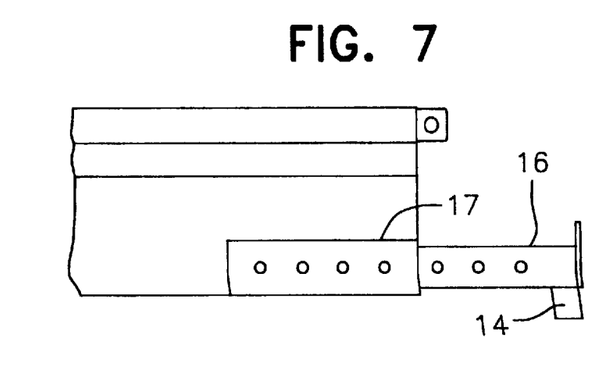
FIG. 7 is a side view of the crash bar of FIG. 6.

Referring to FIGS. 6 and 7 there is illustrated an alternative construction of crash bar assembly indicated generally by the reference numeral 10 mounted on a chassis 12. The chassis 12 carries sockets 13 for reception of the forks of a forklift truck for mounting a forklift truck in piggy-back fashion on the chassis 12. The crash bar assembly 10 comprises an impact absorbing bar 14, having telescopic extensions 15. The impact absorbing bar 14 is in turn mounted by a square sectioned bar 16 within a further square sectioned bar 17 forming a socket. Radial holes are provided in both the socket 17 and the bar 16 for reception of locking pins to allow the crash bar be placed in a number of positions.

Referring to FIG. 8 there is illustrated in somewhat more detail a crash bar assembly indicated generally by the reference numeral 20 having an impact absorbing bar 21 including foldable side extensions 22 connected thereto by pivot pins 23. It will be noted from the drawing that one is shown in a folded stored position and the other is shown on the left hand side of the drawing in an extended position. A spring-loaded locking pin, not shown, is mounted on each extension arm 22 which is engagable with associated locking holes in the impact absorbing bar 21. The impact absorbing bar 21 is mounted by a pair of mild steel channel sections 24 in sockets 25 suspended from the chassis 2 by hanger arms 26. A mounting kit indicated generally by the reference numeral 30 having wheel rest plates 31. A wheel is shown resting on the plates by broken outline and is identified by the reference numeral 32. When it is desired to mount a forklift truck on the vehicle chassis the extension arms 22 are folded inwards as illustrated on the right hand side of the drawing and the forklift mounted with its wheels 32 resting on the wheel plates 31. Then the impact absorbing bar 21 is drawn forwards beneath the piggy-back forklift as shown in FIG. 5 and the extension arms 22 are folded outwards and locked in position to provide a fully rigid crash bar assembly.

Figure 9:
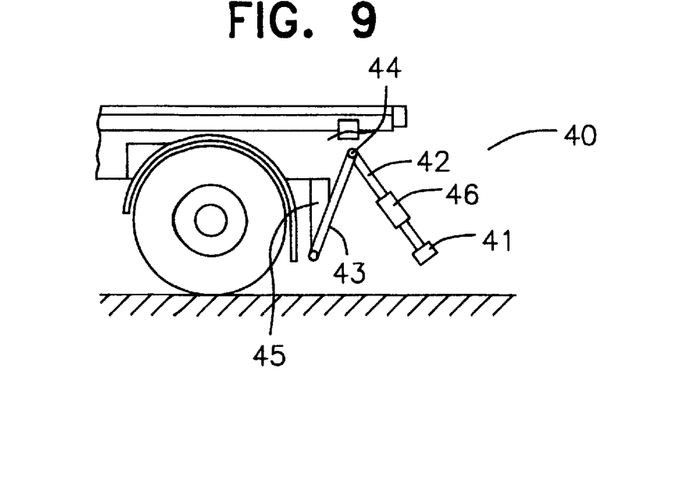
FIG. 9 is a side view of an alternative construction of crash bar according to the invention in a folded position.
Figure 10:
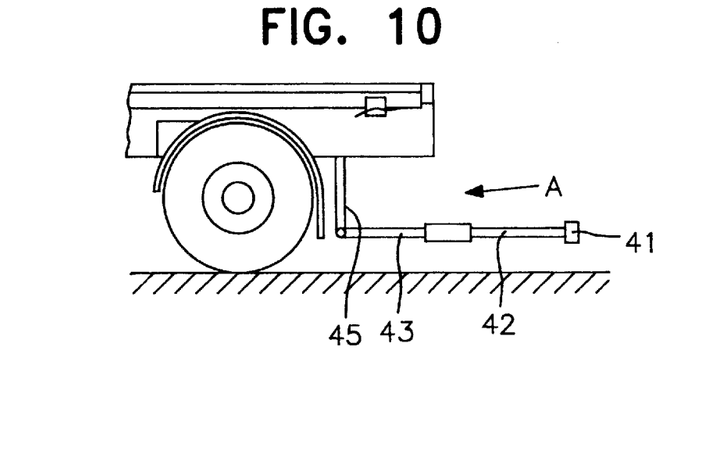
FIG. 10 is a view similar to FIG. 9 showing the crash bar of FIG. 9 in the extended position.

Referring to FIGS. 9 and 10 there is illustrated in diagrammatic form another construction of crash bar assembly indicated generally by the reference numeral 40. This crash bar assembly has one impact absorbing bar 41 mounted by means of a pair of link arms 42 and 43 interconnected by a hinge 44 on a hanger arm 45. A sleeve 46 is slidably mounted on the link arm 42.

In operation when the crash bar assembly is in the position illustrated in FIG. 9 the crash bar assembly acts as a normal crash bar assembly for the truck. However, when a piggy-back forklift is mounted on the truck, the crash bar assembly can be unfolded and it takes up the orientation illustrated in FIG. 10 when the sleeve 46 is moved in the direction of the arrow A (see FIG. 10) to secure the link arms rigidly together.

Figure 11:
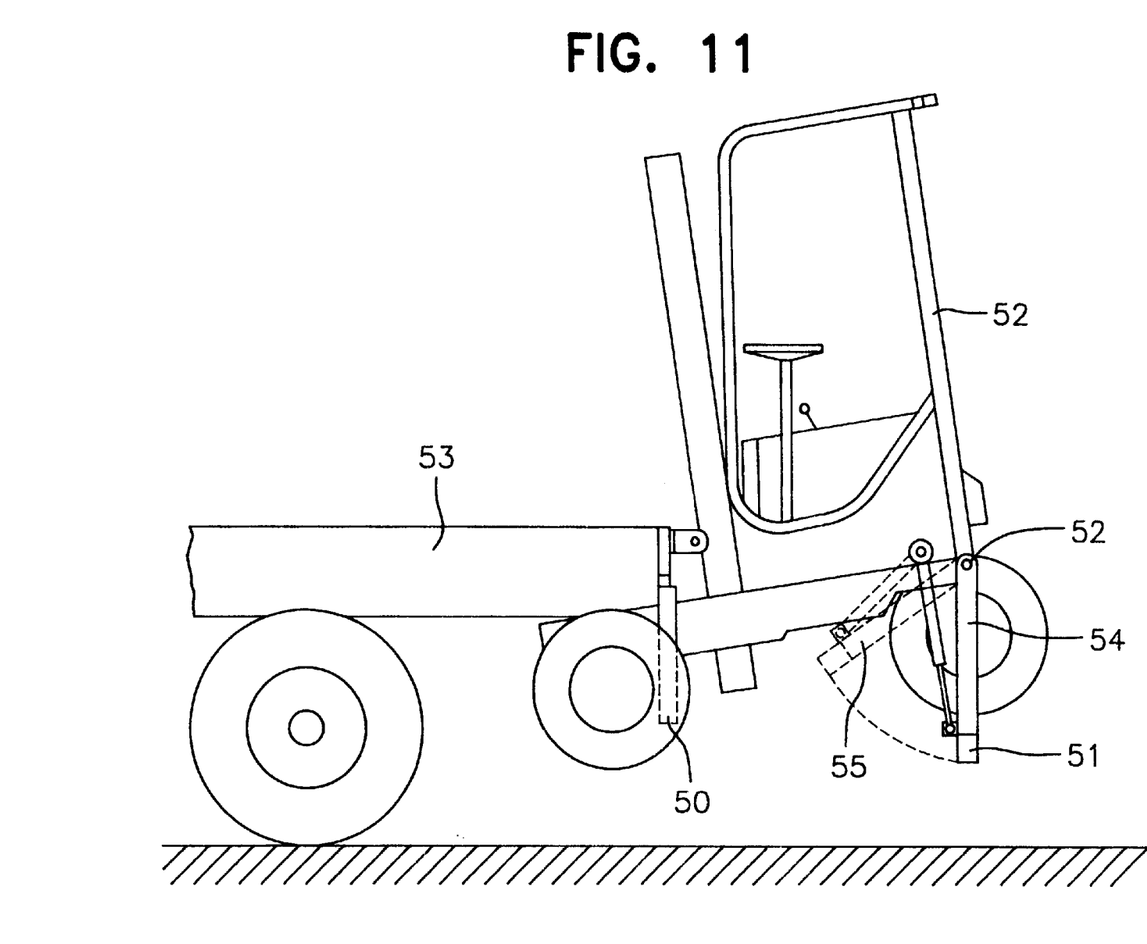
FIG. 11 is a side view of an alternative construction of crash bar mounted on a forklift truck.

Referring to FIG. 11, there is illustrated an alternative construction of crash bar assembly comprising a pair of separate impact absorbing bars, namely a vehicle impact absorbing bar 50 mounted on a vehicle chassis and an equipment impact bar 51 mounted on a piggy-back forklift 52. The piggy-back forklift is illustrated mounted on a vehicle chassis 53. The equipment impact bar 51 is mounted by a link arm 54 on the forklift truck 52 and is pivoted by a pneumatic ram 55. It can be seen how operation of the pneumatic ram 55 pivots the equipment impact bar 51 in and out of position to lie either totally beneath the auxiliary equipment so as to allow the equipment to operate in a normal manner or to form crash bar when being mounted on the rear of a vehicle.

Figures 12, 13:
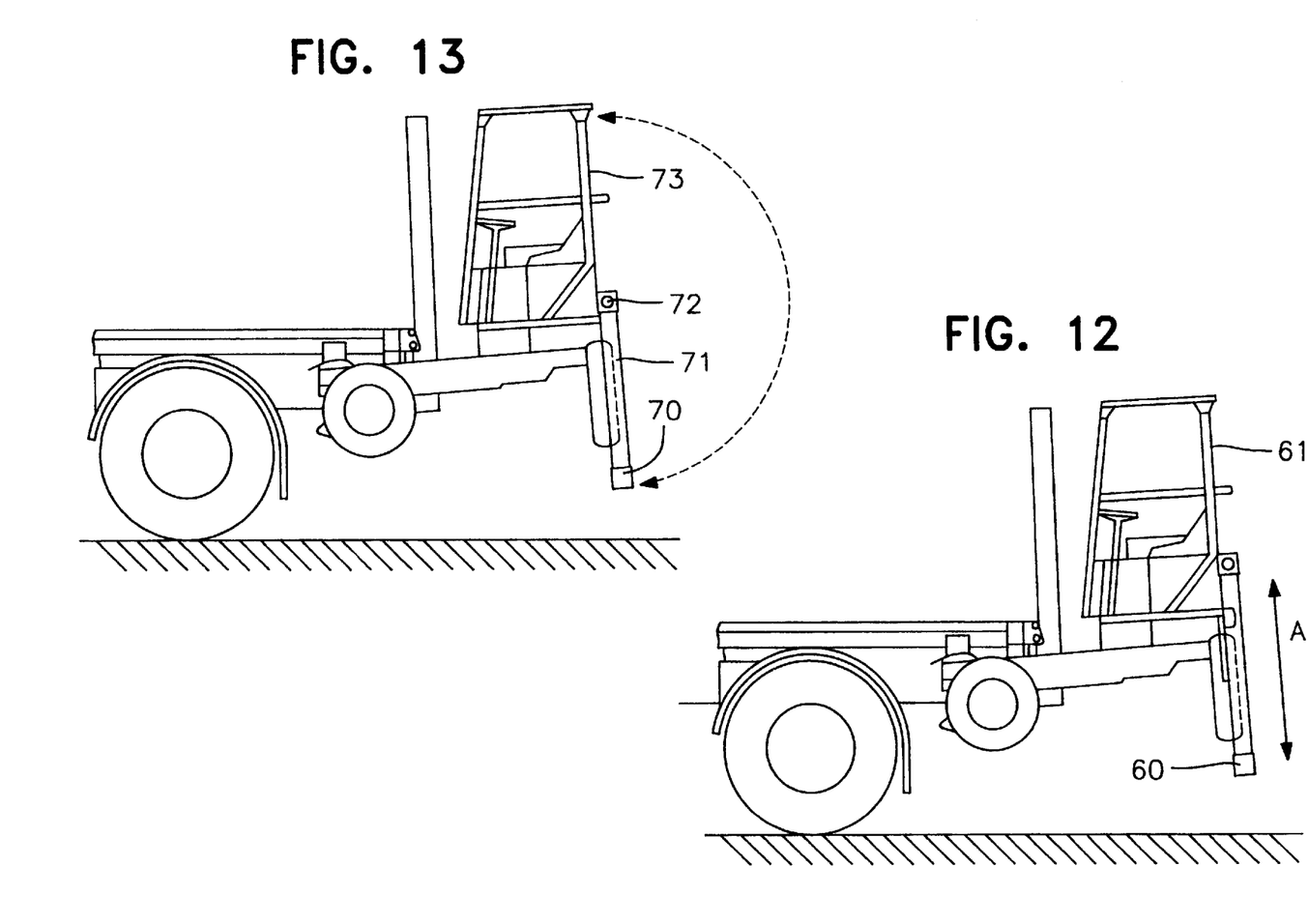
FIG. 12 is a side view similar to FIG. 11 of a still further embodiment of the invention.
FIG. 13 is a still further side view of a forklift mounted on a trailer chassis which forklift incorporates a crash bar according to the invention.

Referring now to FIG. 12 there is illustrated a further alternative construction of equipment impact bar, indicated by the reference numeral 60, mounted on a piggy-back truck 61. In this embodiment, the equipment impact bar 60 is mounted on the rear of the piggy-back truck 61 and is movable up and down in the direction of the arrow A, see FIG. 12. This allows it to act as a crash bar assembly or to be moved out of the way when the piggy-back truck is working.

FIG. 13 illustrates a still further construction of equipment impact bar 70 mounted by means of an arm 71 and pivot pin 72 on the rear of a piggy-back forklift 73. The equipment impact bar 70 is pivotal up and down in the direction of the arrow A as illustrated in FIG. 13.

It should be noted, however, that while the embodiments described above shows a vehicle impact bar mounted on the vehicle chassis in certain instances there may not be an impact bar mounted on the vehicle chassis and thus the equipment impact bar may comprise the whole crash bar assembly.

Various mechanical aids such as ropes and associated pulleys, hydraulic or pneumatic rams may be used in combination with a vehicle impact bar or as the whole assembly. A pulley mounted adjacent the top of the rear of the auxiliary and an associated flexible connector would be particularly useful and may be operated manually or through a power take-off from the auxiliary equipment.

What is claimed is:

1. A crash bar assembly for a vehicle chassis having auxiliary equipment mounting means projecting rearwardly therefrom, said crash bar assembly comprising:

a solid impact absorbing bar having foldable side extension arms connected to said solid impact absorbing bar, said side extension arms being lockable in an extended position;

impact bar mounting means for mounting the solid impact absorbing bar adjacent the rear of the vehicle chassis, the mounting means allowing movement of the solid impact absorbing bar from a storage position to an operative position beyond the vehicle chassis and spaced apart therefrom;

locking means for securing the solid impact absorbing bar in its extended position; and a mounting kit for supporting the wheels of auxiliary equipment, the side extension arms being folded inwardly, away from the solid impact absorbing bar when the wheels are located on the mounting kit and, after movement of the solid impact absorbing bar to the operative position, the side extension arms are folded outwardly and locked in said extended position to provide a fully rigid crash bar assembly.

2. A crash bar assembly as claimed in claim 1, in which the impact bar mounting means is telescopically mounted on the vehicle chassis.

3. A crash bar assembly as claimed in claim 2, in which the impact bar mounting means comprises:

a pair of rearwardly extending support bars connected in spaced apart relationship to the solid impact absorbing bar;

a pair of sockets for reception of the support bars;

means for rigidly connecting the sockets to a vehicle chassis; and locking means for securing the support bars in a number of different relative locations within the sockets comprising a locking pin and associated alignment means formed by axial through holes in the support bars and sockets.

* * * * *